Oct. 29, 1929.  C. J. KINDEL  1,733,460
BED RAIL FASTENER
Filed July 11, 1927
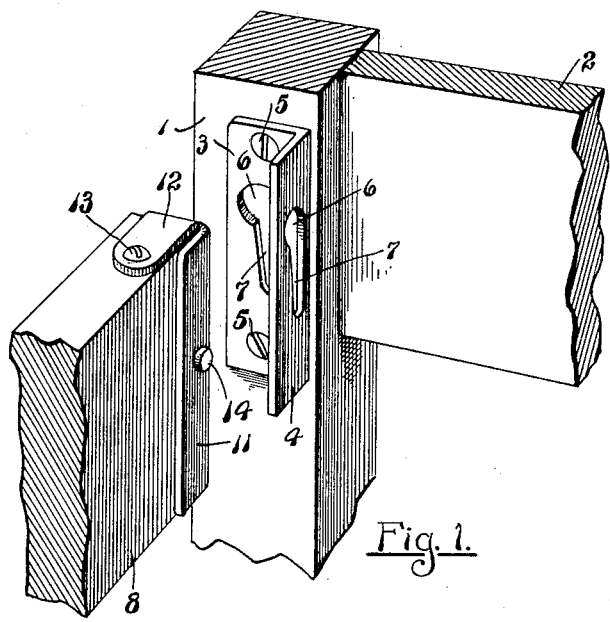
Fig. 1.
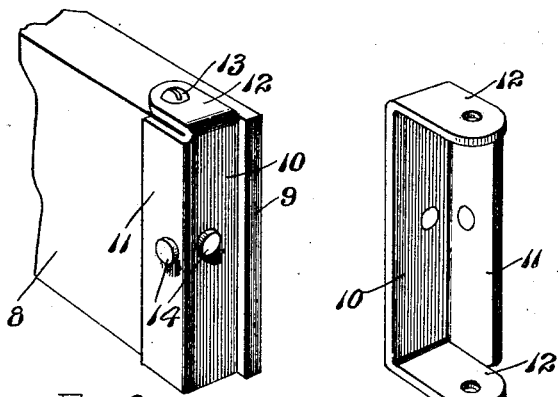
Fig. 3.  Fig. 4.  Fig. 2.
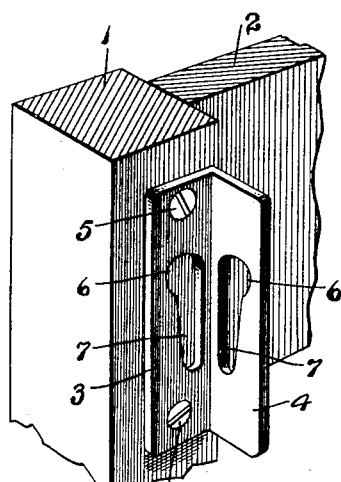
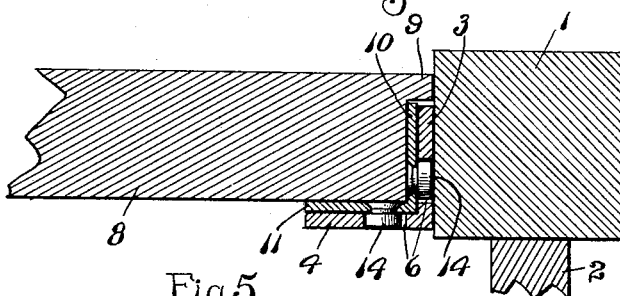
Fig. 5.
Inventor
Charles J. Kindel
By Frank E. Liman, Jr.
Attorney Patented Oct. 29, 1929

1,733,460

UNITED STATES PATENT OFFICE

CHARLES J. KINDEL, OF GRAND RAPIDS, MICHIGAN

BED-RAIL FASTENER

Application filed July 11, 1927. Serial No. 204,777.

This invention relates to a bed rail fastener. It is a primary object and purpose of the present invention to provide a detachable fastener means whereby the side rails of beds may be very positively and securely yet detachably connected to the end members of the bed. The invention consists in novel constructions and arrangements of parts for very practically and effectively attaining the ends stated in a better manner than heretofore.

An understanding of the invention for the attainment of the ends stated, as well as many others not at this time specifically enumerated, will be apparent from the following description taken in connection with the accompanying drawing, in which, Fig. 1 is a perspective view illustrating the fastener of my invention, the rail being shown disconnected from the end of the bed.

Fig. 2 is a fragmentary perspective view illustrating one end of the bed and the part of the fastener which is attached thereto.

Fig. 3 is a fragmentary perspective view showing one end of the bed rail and the part of the fastener used on said rail attached thereto.

Fig. 4 is a perspective view of the part of the fastener which is secured to the end of the bed rail, and Fig. 5 is a fragmentary horizontal section illustrating the rail attached in place, the fastening means used also being shown in section.

Like reference characters refer to like parts in the different figures of the drawing.

Beds ordinarily comprise two ends with spaced apart side or bed rails connecting the ends on which rails the springs or supporting slats for the springs are carried. In order that the bed may be readily knocked down and disassembled the bed rails are connected to the ends by a detachable connection which in operative position should be strong, durable and serviceable but which may be readily detached and disassembled whenever it is desired to disassemble the bed as may occur frequently.

The ends include in their construction vertical posts 1 which are connected by suitable cross members 2 of any desired form or design. In the drawing one post only is shown. On the inner face of each post 1 an angle member having flanges 3 and 4 located at right angles to each other is permanently secured by means of screws 5 which pass through the flange 3 into the post. Both of the flanges 3 and 4 of the angle member have slotted openings made therethrough enlarged as indicated at 6 at their upper ends extending from which is a progressively downwardly narrowing slot 7. It will be noted that the slot 7 has one side vertical and the opposite side inclined to the vertical.

The bed rail 8, usually of wood, at its ends and at its outer side is equipped with a lip 9. In the recess made at the inner side of the lip 9 a metal attaching member is located, it also being of angle form having two flanges 10 and 11 located at right angles to each other. The flange 10 at both its upper and lower ends is turned at right angles to make attaching ears 12 one designed to lie against the upper edge of the bed rail and the other against the lower edge through which securing screws 13 may be passed. The flange 10 lies against the end of the rail while the flange 11 lies against the inner side thereof.

From each of the flanges 10 and 11 a short pin 14 projects outwardly. These pins are permanently secured to the flanges and their length is substantially equal to or slightly less than the thickness of the metal used in the angle member attached to the post 1. The diameter of the pins 14 is somewhat less than the larger portion 6 of the opening cut through each flange 3 and 4 so that the pins may freely enter the wider upper portions of the slots 7.

In the attachment of the bed rail to an end of the bed, the end of the rail is brought against the inner side of the post, the pin 14 on the flange 10 entering the opening 6 in the flange 3, which opening is large enough that the rail may be moved outwardly sufficient that the pin 14 on the flange 11 may pass within the side of the flange 4 and come to the opening 6 in said flange 4. Then by moving the rail inwardly the pin 14 on the flange 11 will pass into the opening 6 in the flange 4. The rail may then be moved downwardly so that both pins will be received and wedged in the upper wider portions of the slots 7. This makes a secure and firm connection yet one which may be readily detached by merely lifting up the end of the bed rail and shifting it laterally a short distance and then moving it longitudinally after the pin 14 on the flange 11 has been disconnected from the opening in the flange 4. The lip 9 projects from the end of the rail 8 a distance equal to the thickness of the two flanges 3 and 10 so that when the rail is attached the detachable connecting means used is wholly covered and is not visible at the outer side of the bed.

The construction described is very practical and has so proved in use. A particularly rigid and durable attaching means is provided in the structure described. While the structure has been described and shown as of great utility when used with beds, it is to be understood that the invention is not limited in use to beds alone but may be used with a great many other articles of furniture or the like where a readily disassembled structure of the knock-down type may be desirable. The invention is defined in the appended claims and is to be considered comprehensive of all forms of structure coming within their scope.

I claim:

1. The combination with a structure having a vertical member and a horizontal rail extending radially therefrom, of means for detachably connecting an end of said rail to said vertical member comprising an angle member having two vertical legs extending at right angles to each other, one of said legs being attached to said vertical member parallel with an end of said rail and the other leg extending parallel with a vertical longitudinal face of the rail and each of said legs having a slot with an edge farthest from the angle of the angle member inclined downwardly toward said angle, and a second angle member on said rail having two vertical legs arranged at right angles to each other, one leg lying adjacent the end of the rail and the other lying against a vertical longitudinal face of the rail and a pin projecting outwardly from each leg of said second angle member and adapted to enter the respective slots in the first angle member and engage inclined edges thereof.

2. The combination with a structure having a vertical member and a horizontal rail extending radially therefrom, of means for detachably connecting an end of said rail to said vertical member comprising an angle member having two vertical legs extending at right angles to each other, one of said legs being attached to said vertical member parallel with an end of said rail and the other leg extending parallel with a vertical longitudinal face of the rail and each of said legs having a slot with an edge farthest from the angle of the angle member inclined downwardly toward said angle, and a second angle member on said rail having two vertical legs arranged at right angles to each other lying against a vertical longitudinal face of the rail and a pin projecting outwardly from each leg of said second angle member and adapted to enter the respective slots in the first angle member and engage inclined edges thereof, and means formed as a part of said second angle member for attaching it to said rail.

In testimony whereof I affix my signature.

CHARLES J. KINDEL.